United States Patent
Asahara et al.

[11] Patent Number: 5,363,724
[45] Date of Patent: Nov. 15, 1994

[54] SPEED STAGE SHIFTING OF AUTOMATIC TRANSMISSION BY REDUCTION OF SERVO OIL PRESSURE TO SLIP LIMIT STAND-BY PRESSURE AND SUBSEQUENT DECREMENTS

[75] Inventors: Norimi Asahara, Aichi; Yasuo Hojo, Nagoya; Hideaki Ohtubo, Toyota, all of Japan

[73] Assignee: Toyota Jidosha Kabushiki Kaisha, Toyota, Japan

[21] Appl. No.: 952,981

[22] Filed: Sep. 29, 1992

[30] Foreign Application Priority Data

Oct. 7, 1991 [JP] Japan ................... 3-287142

[51] Int. Cl.⁵ .................. F16H 61/06; F16H 61/08
[52] U.S. Cl. ................. 477/143; 364/424.1; 477/156
[58] Field of Search ............. 74/866, 867; 364/424.1

[56] References Cited

U.S. PATENT DOCUMENTS

| | | | |
|---|---|---|---|
| 4,722,247 | 2/1988 | Shindo et al. | 74/866 |
| 4,727,772 | 3/1988 | Sumiya et al. | 74/867 |
| 4,793,216 | 12/1988 | Hiramatsu et al. | 74/866 |
| 5,072,390 | 12/1991 | Lentz et al. | 364/424.1 |
| 5,085,105 | 2/1993 | Wakahara et al. | 74/866 |
| 5,207,122 | 5/1993 | Minagawa | 74/866 |
| 5,282,401 | 2/1994 | Hebbale et al. | 74/866 |

FOREIGN PATENT DOCUMENTS

| | | |
|---|---|---|
| 61-99745 | 5/1986 | Japan . |
| 3-177654 | 8/1991 | Japan . |
| 3-177655 | 8/1991 | Japan . |
| 3-177656 | 8/1991 | Japan . |

Primary Examiner—Dirk Wright
Assistant Examiner—Khoi Q. Ta
Attorney, Agent, or Firm—Oliff & Berridge

[57] ABSTRACT

In a certain speed stage shifting of an automatic transmission of a vehicle including a speed change gear mechanism including rotary members such as gears and gear carriers and hydraulically operated friction engaging brakes and clutches adapted to provide various speed stages according to selective engagement and disengagement of the friction engaging brakes and clutches, the servo oil pressure of a first friction engaging brake is immediately lowered down to a stand-by pressure marginally higher than a threshold pressure bordering non sliding and sliding of the first friction engaging brake at the start of a change-over of a second friction engaging brake is and then, when a substantial change-over of the second friction engaging means started, the servo oil pressure is further lowered across the threshold pressure and thereafter periodically lowered by a decrement the magnitude of which may desirably be increased along with a lapse of time.

3 Claims, 3 Drawing Sheets

SPEED STAGE SHIFTING OF AUTOMATIC TRANSMISSION BY REDUCTION OF SERVO OIL PRESSURE TO SLIP LIMIT STAND-BY PRESSURE AND SUBSEQUENT DECREMENTS

BACKGROUND OF THE INVENTION

1. Field of the Invention

The present invention relates to a control of an automatic transmission of a vehicle, and more particularly, to a speed stage shifting of an automatic transmission of a vehicle which is carried out by a change-over of engagement and disengagement of friction engaging means.

2. Description of the Prior Art

In an automatic transmission constructed as a tandem combination of a first gear unit including a first planetary gear mechanism and friction engaging means for changing over speed change gear ratios thereof and a second gear unit including a second or a second and a third planetary gear unit and friction engaging means for changing over the speed change gear ratios thereof, so as to provide an overall speed change gear ratio by the multiplication of the speed change gear ratio of the first gear unit and that of the second gear unit, when the speed stage of the transmission is changed over in such a manner that the first and second gear units are shifted in opposite directions so that the first gear unit is shifted down whereas the second gear unit is shifted up, or vice versa, if the tinting of the switching-over of the gear ratio of the first gear unit is not properly coordinated with that of the second gear unit, there would occur a steep change of the overall transmission gear ratio during the speed stage shifting, thereby generating a very uncomfortable speed stage shift shock in the vehicle. In more detail, when, for example, the first gear unit is shifted down by the disengagement of a first friction engaging means, while the second gear unit is shifted up by the engagement of a second friction engaging means, so as thereby to decrease the overall reduction gear ratio of the transmission, i.e. to shift up the transmission, if the downshifting of the first gear unit by the disengagement of the first friction engaging means starts virtually earlier than the upshifting of the second gear unit by the engagement of the second friction engaging means when the first and second gear units are instructed at the same time to start the respective shiftings, at an initial phase of the upshifting, the transmission gear ratio increases, contrary to an upshifting operation of the transmission. In order to solve this problem, it has been proposed in Japanese Patent Laid-open Publication 61-99745 to first start only the second friction engaging means of the second gear unit, and upon the detection of a virtual upshifting of the second gear unit, to instruct the downshifting of the first gear unit.

However, it would be too late, even when the first friction engaging means is relatively quick in the progress of its disengagement operation, to dispatch a control signal for the disengagement of the first friction engaging means when the upshifting of the second gear unit has virtually started. In view of this, it has been proposed in Japanese Patent Application 3-126792 to provisionally lower the servo oil pressure of the first friction engaging means down to a predetermined stand-by pressure at the same time as the start of the engagement process of the second friction engaging means until the virtual upshifting of the second gear unit starts, wherein said stand-by pressure is selected to be such a pressure level at which the first friction engaging means does not slide but will immediately start to slide if the oil pressure is further lowered.

By so delaying the start of disengagement of the first friction engaging means in the state that enables an immediate start of a substantial disengagement, it would be possible to coordinate the downshifting of the first gear unit with the upshifting of the second gear unit with neither delay nor advance of one relative to the other. However, when the first friction engaging means immediately starts its substantial disengagement at a delayed time point during the speed stage shifting, and therefore, inevitably completes its full disengagement in a relatively short time, the rate of change of disengagement would become high, although it is still desired that the first friction engaging means should make no abrupt change of disengagement during the progress of the speed stage shifting.

SUMMARY OF THE INVENTION

In view of the above-mentioned problem in the speed stage shifting which is most likely to occur in an automatic transmission of the type comprising a tandem combination of first and second gear units respectively shiftable in opposite directions, it is the object of the present invention to provide a more improved method of speed stage shifting applicable to such an automatic transmission which provides a speed stage shifting with a first gear unit shifted in a direction opposite to the direction of the overall speed stage shifting of the transmission available by the multiplication of the shifting of a second gear unit in the direction of the overall speed stage shifting and the shifting of said first gear unit in the reversed direction.

According to the present invention, the above-mentioned object is accomplished by a method of speed stage shifting of an automatic transmission of a vehicle driven by an engine, said transmission comprising a speed change gear mechanism including rotary members such as gears and gear carriers and hydraulically operated friction engaging means and adapted to provide various speed stages according to selective engagement and disengagement of said friction engaging means, including a certain speed stage shifting during which a first one of said friction engaging means is disengaged, while a second one of said friction engaging means changes engagement/disengagement state thereof, comprising the steps of:

detecting rotation speed of a first one of said rotary members which changes rotation speed thereof according to the progress of the disengagement of said first friction engaging means during said certain speed stage shifting;

detecting rotation speed of a second one of said rotary members which changes rotation speed thereof according to the progress of the change of engagement/disengagement state of said second friction engaging means during said certain speed stage shifting;

changing hydraulic pressure of said second friction engaging means at a gradual rate;

provisionally lowering hydraulic pressure of said first friction engaging means to a predetermined stand-by pressure with the start of said change of hydraulic pressure of said second friction engaging means, said stand-by pressure being such a pressure level that is slightly higher than a threshold pressure across which said first friction engaging means is changed from a nonsliding state to a sliding state;

further lowering the hydraulic pressure of said first friction engaging means from said stand-by pressure across said threshold pressure when it was detected that the rotation speed of said second rotary member has changed across a predetermined threshold value therefor, with further subsequent periodical lowering thereof by a decrement until it is detected that the rotation speed of said first rotary member has changed across a predetermined threshold value therefor; and further lowering the hydraulic pressure of said first friction engaging means in coordination with the change of hydraulic pressure of said second friction engaging means toward a completion of the speed stage shifting.

The magnitude of said decrement may desirably be increased along with a lapse of time from the start of said periodical lowering of the hydraulic pressure of said first friction engaging means by said decrement, so that said first friction engaging means is disengaged with a higher gradualness, while the disengagement of said first friction engaging means is timely finished.

When an upshifting occurs due to a decrease of the throttle opening relative to the vehicle speed, the engine output may quickly lower. In this case, the disengagement of said first friction engaging means, when it has an effect of increasing the rotation speed of the engine, may be expedited as compared in an upshifting due to an increase of the vehicle speed relative to the throttle opening. Therefore, when such a control on a real time basis is effected for the disengagement of said first friction engaging means, the magnitude of said decrement may be made relatively greater when the speed stage shifting is an upshifting due to a decrease of the throttle opening relative to the vehicle speed than when the speed stage shifting is an upshifting due to an increase of the vehicle speed relative to the throttle opening.

BRIEF DESCRIPTION OF THE DRAWINGS

In the accompanying drawings.

DESCRIPTION OF THE PREFERRED EMBODIMENT

The present invention will now be described in more detail with respect to a preferred embodiment and in reference to the accompanying drawings.

Figure 1:
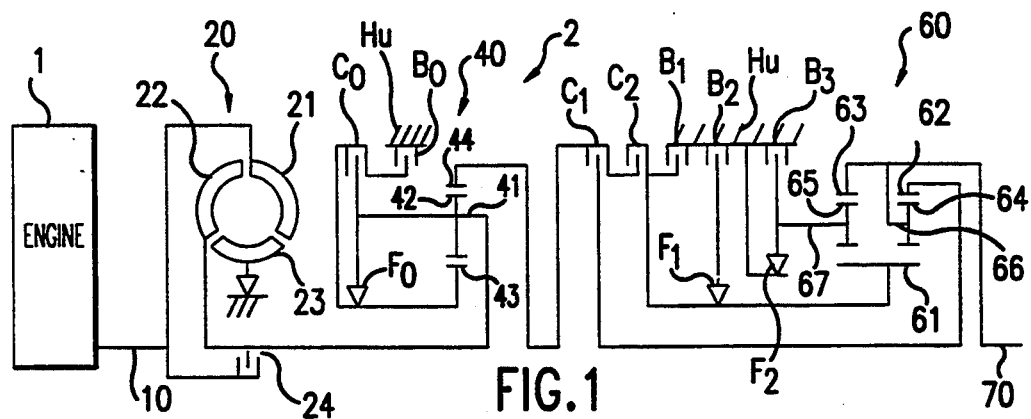
FIG. 1 is a diagrammatical illustration of a combination of an engine and an automatic transmission of a vehicle.

FIG. 1 diagrammatically illustrates a combination of an engine and an automatic transmission of a vehicle to which the speed stage shift control according to the present invention may be applied. An engine 1 is power transmittingly connected with the vehicle drive wheels (not shown in the figure) through a transmission 2 which comprises a torque converter 20, of a conventional type, having a pump 21 connected with the engine 1 via an input shaft 10, a turbine 22, a stator 23 and a lock-up clutch 24 for selectively directly connecting the pump 21 with the turbine 22. The transmission 2 further comprises a first gear unit 40 including a planetary gear mechanism having a sun gear 43, a ring gear 44, a planetary pinion 42 and a carrier 41 connected with the turbine 22 of the torque converter 20, a clutch C0 for selectively connecting the sun gear 43 with the carrier 41, a brake B0 for selectively braking the sun gear 43 relative to a housing Hu and a one way clutch F0 for torque transmittingly connecting the sun gear 43 with the carrier 41 in only one rotational direction. Further, the transmission 2 also comprises a second gear unit 60 including a first planetary gear mechanism having a sun gear 61, a ring gear 62, a planetary pinion 64 and a carrier 66, a second planetary gear mechanism having the sun gear 61 in common with the first planetary gear mechanism, a ring gear 63, a planetary pinion 65 and a carrier 67, a clutch C1 for selectively connecting the ring gear 62 with the ring gear 44 of the first gear unit 40, a clutch C2 for selectively connecting the sun gear 61 with the ring gear 44 of the first gear unit 40, a brake B1 for selectively braking the sun gear 61 relative to the housing Hu, a series combination of a brake B2 and a one way clutch F1 for selectively braking the sun gear 61 in only one rotational direction when the brake B2 is engaged, a brake B3 for selectively braking the carrier 67 relative to the housing Hu, and a one way clutch F2 for braking the carrier 67 relative to the housing Hu in only one rotational direction, wherein the carrier 66 and the ring gear 63 are connected with one another and with an output shaft 70 of the transmission.

Figure 2:
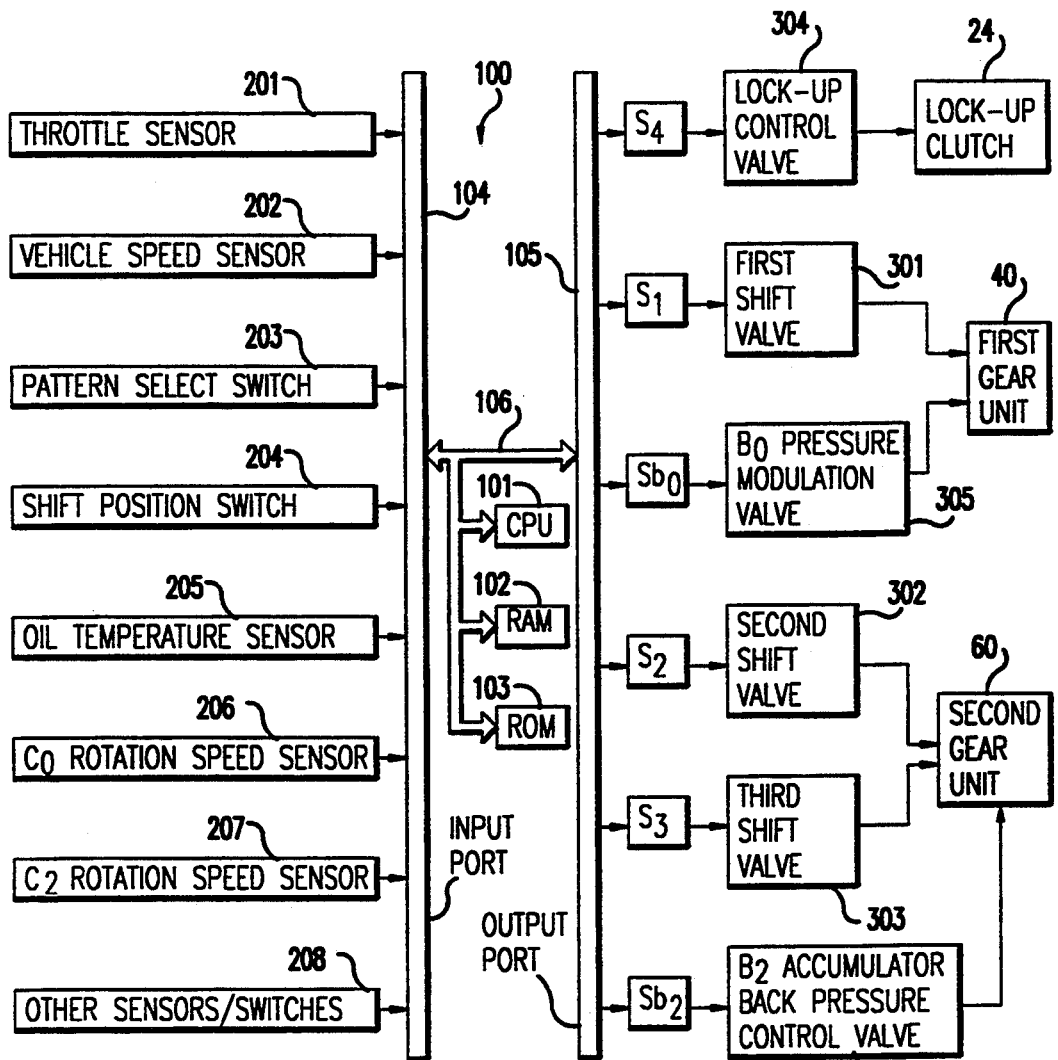
FIG. 2 is a diagrammatical illustration of a control system for changing over the gear train shown in FIG. 1 for various speed stages with a simultaneous modification of engine output torque according to the present invention.

The clutches C0, C1 and C2 and the brakes B0, B1, B2 and B3 may be hydraulically operated to be engaged or disengaged by an electro-hydraulic control system, the general concept of which is well known in the art, in such a manner that solenoid-operated change-over valves change over supply and exhaust of hydraulic pressure to and from the respective clutches and brakes under the control of an electronic control unit. FIG. 2 shows such an electro-hydraulic control system in a diagrammatical illustration with respect to some components thereof relevant to the description of the present invention, wherein certain components are more relevant to the present invention as described hereinunder.

The tandem connection of the first gear unit 40 and the second gear unit 60 may be controlled according to the conventional method to provide four forward speed stages by the second gear unit 60 being changed over between three different gear ratios while the first gear unit 40 is maintained in its lower gear stage to provide 1st, 2nd and 3rd speed stages, and then to provide 4th speed stage as an overdrive stage by changing over the first gear unit 40 to its higher gear stage while maintaining the second gear unit 60 at the 3rd speed stage. (Of course a reverse stage is also provided, as is well known in the art.) Alternatively, the tandem connection, shown in FIG. 1, of the first gear unit 40 and the second gear unit 60 may be controlled by the electrohydraulic control unit shown in FIG. 2 so as to provide six forward speed stages by on and off combinations of the clutches C0-C2, the brakes B0-B3 and the one way clutches F1-F2 as shown in Table 1:

TABLE 1

| Range | Speed | C0 | B0 | C1 | C2 | B1 | B2 | B3 | F0 | F1 | F2 |
|-------|-------|----|----|----|----|----|----|----|----|----|----|
| R | — | o |   |   | o |   |   |   | o | o |   |
| D | 1st | o |   | o |   |   |   |   | o |   | o |
| D | 2nd |   | o | o |   |   |   |   |   |   | o |
| D | 3rd | o |   | o |   | o |   |   | o | o |   |
| D | 4th |   | o | o |   | o |   |   |   | o |   |
| D | 5th | o |   | o | o | o |   |   | o |   |   |
| D | 6th |   | o | o | o | o |   |   |   |   |   |
| 2 | 1st | o |   | o |   |   |   |   | o |   | o |
| 2 | 2nd |   | o | o |   |   | o |   |   |   | o |
| L | 1st | o |   | o |   |   | o | o | o |   |   |

In the above table, "o" indicates that the clutch, brake or one way clutch is engaged at the corresponding speed stage under the corresponding shift range. In an embodiment of the tandem combination of the first gear unit 60 and the second gear unit 40, the reduction gear ratios of 1st, 2nd, 3rd, 4th, 5th and 6th speed stages are 2.804, 1.977, 1.532, 1.080, 1.000 and 0.705, respectively.

As is reflected in the above table, the first gear unit 40 is changed over from the lower gear stage, having a larger reduction gear ratio, to the higher gear stage, having a smaller reduction gear ratio, during upshifting from 1st to 2nd speed stage, from 3rd to 4th speed stage, and from 5th to 6th speed stage. Conversely, it is changed over from the higher gear stage to the lower gear stage during upshifting from 2nd to 3rd speed stage, and from 4th to 5th speed stage. During downshiftings from the 6th speed stage to the 1st speed stage, through the intermediate speed stages, the clutches and the brakes are of course engaged or disengaged in a manner reverse to those during upshiftings. So, for example, during downshifting from the 6th speed stage to the 5th speed stage, the brake B0, which has been engaged, is gradually disengaged, and the clutch Co, which has been disengaged, is gradually engaged. In this case, however, since the one way clutch F0 is provided in parallel with the clutch Co, the rate of changing over of the gear stage from the 6th speed stage to the 5th speed stage, on a time basis, may be substantially controlled by the rate of disengaging the brake B0 so that, as the brake B0 is gradually disengaged, the sun gear 43 is allowed to start and then to increase its speed of rotation until it catches the rotation speed of the carrier 41, whereupon the one way clutch F0 is automatically engaged to produce the 5th speed stage. Thereafter the clutch C0 is engaged so as to complete the direct connection between the input and output members of the first gear unit 40 for both engine driving and engine braking. Similarly, during downshifting from the 4th speed stage to the 3rd speed stage, or during upshifting from the 2nd speed stage to the 3rd speed stage, the rate of changing-over of the engagement of the brake B0 to the engagement of the clutch C0 may be controlled only by the control of the rate of disengagement of the brake B0.

Referring to FIG. 2, the electro-hydraulic control system comprises an electronic control unit 100 which is now available in various standards in the art as a hardware generally including a central processing unit (CPU) 101, a random access memory (RAM) 102, a read only memory (ROM) 103, an input port means 104, an output port means 105 and a common bus means 106 interconnecting these components The electronic control unit 100 is supplied with various data, through the input port means 104, such as throttle opening from a throttle sensor 201, vehicle speed from a vehicle speed sensor 202, patterns of driving such as the economy pattern putting preference on the economical performance of the vehicle and the power pattern putting preference on the power performance of the vehicle from a pattern select switch 203, shift positions such as R, N, D, 2 and L set by a manual lever from a shift position switch 204, oil temperature from an oil temperature sensor 205, rotation speed of an outer drum of the clutch C0 from a C0 rotation speed sensor 206, rotation speed of an outer drum of the clutch C2 from a C2 rotation speed sensor 207, and other data from other sensors and/or switches or the like generally designated by 208.

In the electronic control unit 100, the CPU 101 conducts predetermined calculations including those described in detail hereinunder particularly according to the present invention based upon the data received from the sensors and/or switches and the programs stored in the ROM 103 in cooperation of the RAM 102, and outputs control signals to a hydraulic control means including various standard components not shown in the figure and particularly the following components:

S1 is a solenoid valve which controls, according to on and off thereof, change-over of a first shift valve 301 which in turn controls the supply and exhaust of oil pressure to and from the clutch C0 and the brake B0 of the first gear unit 40.

S2 and S3 are solenoid valves which control, according to on and off thereof, change-over of a second shift valve 302 and a third shift valve 303, respectively, which in turn control the supply and exhaust of oil pressure to and from the clutches C1 and C2 and the brakes B1, B2 and B3 of the second gear unit 60.

S4 is a solenoid valve which controls, according to on and off thereof, change-over of a lock-up control valve 304 which in turn controls the supply and exhaust of oil pressure to and from the lock-up clutch 24.

Sb0 is a solenoid valve which controls, according to periodical on and off thereof, an opening of a B0 pressure modulation valve 305 which in turn controls the oil pressure in the brake B0 so that the pressure in the brake B0 is continually changed according to the duty ratio of the on and off of the solenoid valve Sb0.

Sb2 is a solenoid valve which controls, according to periodical on and off thereof, an opening of a B2 accumulator back pressure control valve 306 which in turn controls the back pressure in an accumulator for the brake B2 so that the speed of engagement or disengagement of the brake B2 is continually changed according to the duty ratio of the on and off cycle of the solenoid valve Sb2.

The method of speed stage shifting of the automatic transmission according to the present invention will be described with respect to an upshifting of the transmission from the 2nd speed stage to the 3rd speed stage during which, in the first gear unit 40, the brake B0 is gradually disengaged, whereby an outer case, or housing, of the clutch C0 starts to rotate and gradually increases its rotation speed until the one way clutch F0 is finally engaged, so that the first gear unit 40 is changed over from its higher gear stage to its lower gear stage, while in the second gear unit 60 the clutch C1 is kept engaged and the brake B2 is now gradually engaged, whereby the sun gear 61 is gradually decelerated toward stoppage by the action of the brake B2 via the one way clutch F1, so that the second gear unit 60 is changed over to decrease its reduction gear ratio from its largest forward drive reduction gear ratio to the next lower forward drive reduction gear ratio. The state of disengagement of the brake B0 is detected by the rotation speed of an outer case, or housing, of the clutch C0, available from the C0 rotation speed sensor 206. The state of engagement of the brake B2, which brakes the sun gear 61 from rotation via the one way clutch F1, is detected by the rotation speed of an outer case, or housing, of the second clutch C2 connected with the sun gear 61, available from the C2 rotation speed sensor 207.

Figure 3:
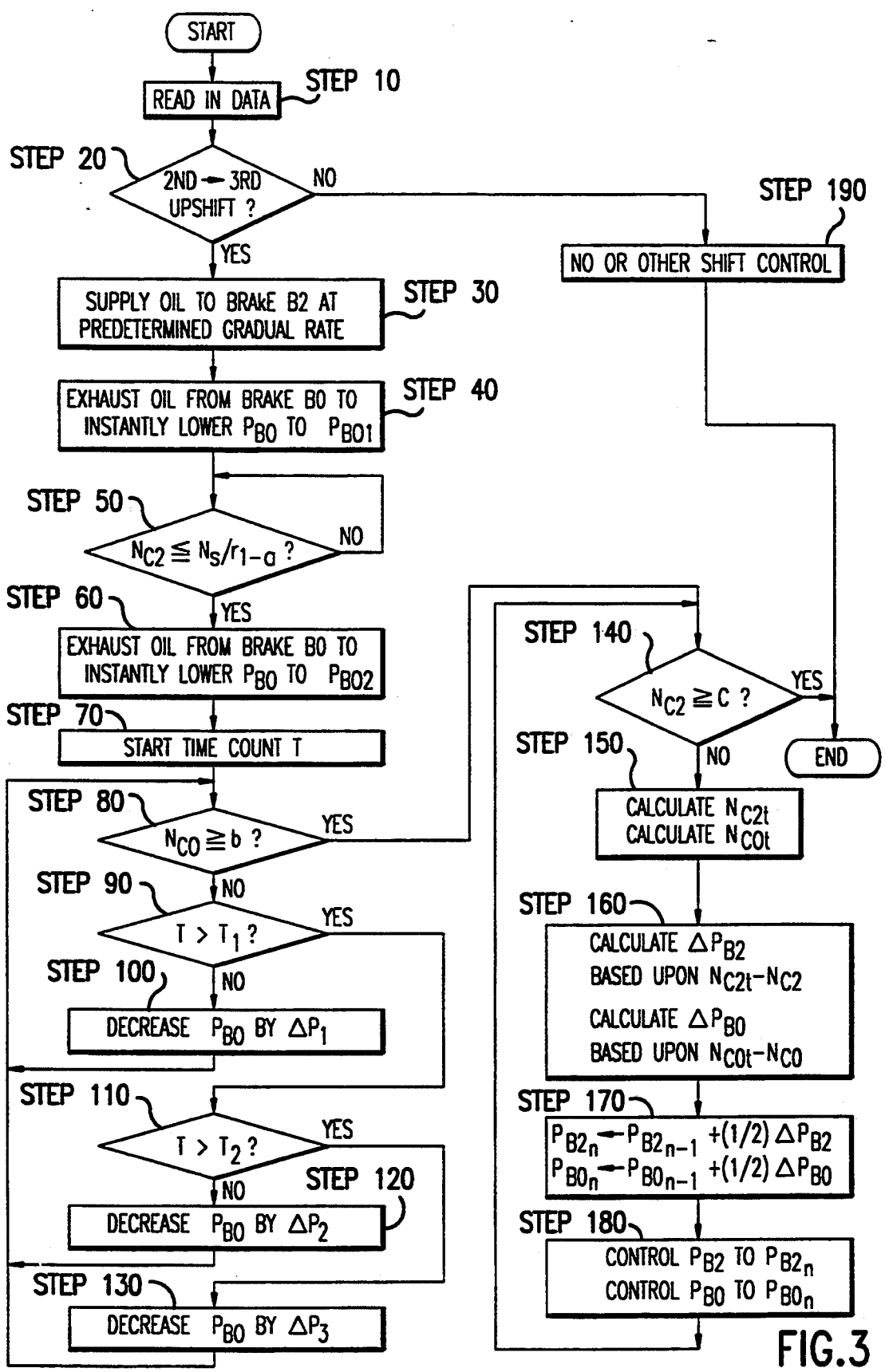
FIG. 3 is a flowchart illustrating an embodiment of the control routine carried out according to the present invention.
Figure 4:
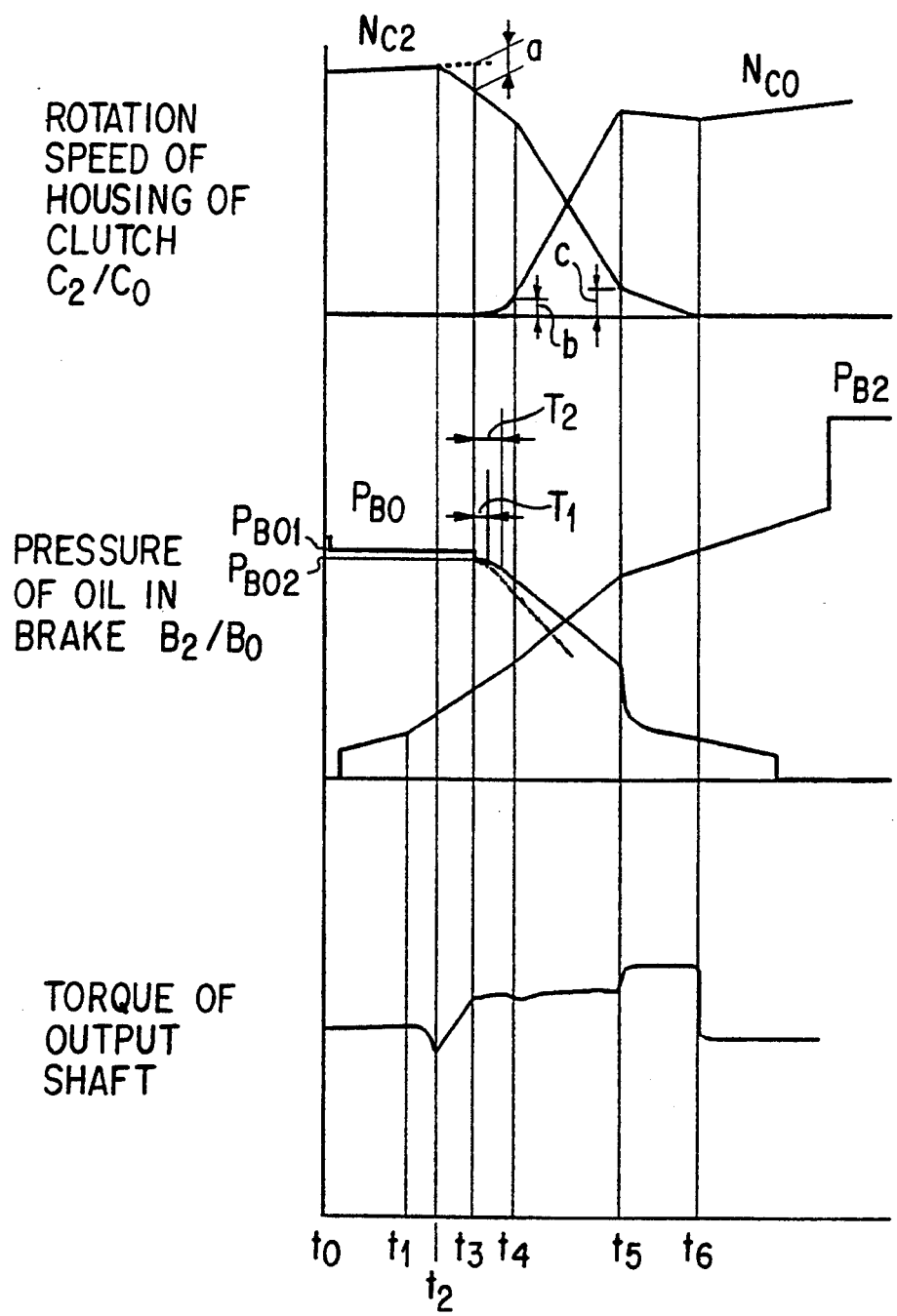
FIG. 4 is a diagram illustrating changes of several factors in an upshifting control carried out according to the control routine shown in FIG. 3.

FIG. 3 shows an embodiment of the control process carried out by the control system shown in FIG. 2 during the upshifting of the transmission shown in FIG. 1 from the 2nd speed stage to the 3rd speed stage, and FIG. 4 is a diagram showing changes of several factors effecting the control process shown in FIG. 3.

Referring to FIG. 3, the control routine shown in the flowchart is periodically repeated at a predetermined scanning cycle, such as several microseconds. When the control is started, in step 10 data are read in from various sensors and switches (such as those shown in FIG. 2), and control process proceeds to step 20.

In step 20, it is judged, based upon the read in data, if the upshifting from the 2nd speed stage to the 3rd speed stage, in the present example, is to be carried out. If the answer is YES, the control process proceeds to step 30 to carry out such upshifting, whereas if the answer is NO, the control process proceeds to step 190 for no shift control or other shift control.

When the upshifting from the 2nd speed stage to the 3rd speed stage is to be carried out, in step 30 supply of oil to the brake B2 at a predetermined gradual rate is started, and also in step 40, the oil pressure PB0 of the brake B0 is immediately lowered down to a predetermined stand-by pressure PB01 that is slightly higher than a threshold pressure across which the brake B0 changes from a non sliding state to a sliding state. The stand-by pressure is determined to be such a pressure level at which the brake B0 does not slide in spite of changes of the torque applied to the brake B0 within a design range, but immediately starts to slide when the pressure is slightly lowered. Then the control process proceeds to step 50.

In step 50, it is judged if the engagement of the brake B2 has proceeded to a predetermined degree, based upon a comparison of the rotation speed NC2 of the housing of the clutch C2, which represents the rotation speed of the sun gear 61, and the rotation speed Ns of the output shaft 70 of the transmission 2 detected directly or indirectly by the vehicle speed sensor 202. When the brake B1 is completely disengaged, NC2 is equal to Ns/r1, wherein r1 is a ratio of the number of teeth of the sun gear 61 to the number of teeth of the ring gear 62. Therefore, the predetermined degree of engagement of the brake B2 is judged by detecting if NC2 is equal to or smaller than Ns/r1 - a, wherein "a" is an amount predetermined for this judging purpose. If the answer is YES, the control process proceeds to step 60, whereas if the answer is NO, the control process repeats the judging step until the answer changes to YES, i.e. until NC2 decreases as much as "a" relative to Ns/r1.

In step 60, the oil pressure of the brake B0 is further lowered from the stand-by pressure PB01 across the above-mentioned threshold pressure down to a pressure PB02 which immediately starts sliding of the brake B0, and gradually increases the rotation speed of the brake B0 as a more amount of oil is exhausted from the brake B0. At the same time, in step 70, a timer is started to count time T. Then the control process proceeds to step 80.

In step 80, it is judged if the rotation speed of the housing of the clutch C0, i.e. the rotation speed of the sun gear 43, has increased up to a predetermined value "b". If the answer is NO, the control process proceeds to step 90.

In step 90, it is judged if the time count T is over a first predetermined time T1, and if the answer is NO, the control process proceeds to step 100, whereas if the answer is YES, the control process proceeds to step 110.

In step 100, the hydraulic pressure PB0 of the brake B0 is further decreased by a decrement $\Delta P1$ which is a relatively small amount to provide a relatively moderate initial slope down of the pressure as shown in FIG. 4. Then the control process returns to step 80. Until the time count T exceeds the time T1, each time the control cycle is repeated, the pressure PB0 is lowered by the decrement $\Delta P1$.

In step 110, it is judged if the time count T is over a second predetermined time T2, and if the answer is NO, the control process proceeds to step 120, whereas if the answer is YES, the control process proceeds to step 130.

In step 120, the hydraulic pressure PB0 of the brake B0 is further lowered by a decrement $\Delta P2$ which is greater than the decrement $\Delta P1$ so as to increase the rate of slopedown of the pressure. Then the control process returns to step 80. Until the time count T exceeds the time T2, each time when the control cycle is repeated, the pressure PB0 is lowered by the decrement $\Delta P2$. In step 130, the hydraulic pressure PB0 of the brake B0 is further lowered by a decrement $\Delta P3$ which is further greater than the decrement $\Delta P2$ so as to further increase the rate of slopedown of the pressure. Then the control process returns to step 80.

The control steps 80-130 are repeated until the rotation speed NC0 of the housing of the clutch C0 reaches the predetermined value "b". When it was judged in step 80 that NC0 has reached the value "b", then the control process proceeds to step 140.

In step 140, it is judged if the 2nd to 3rd upshifting has been substantially completed. In the shown control routine, the substantial completion of the 2nd to 3rd upshifting is judged by detecting if NC2 has decreased to be equal to or smaller than a predetermined amount "c", as braked by the brake B2 via the one way clutch F1.

Until the substantial completion of the 2nd to 3rd upshifting, in step 150, a target rotation speed NC2t for the housing of the clutch C2 and a target rotation speed NC2t for the housing of the clutch C0 are calculated by the CPU 101 based upon a program stored in the ROM 103. Then, in step 160, based upon the difference between the calculated target rotation speed NC2t and the actual rotation speed NC2 detected by the C2 rotation speed sensor 207, an amount of modification $\Delta PB2$ to be effected with respect to the oil pressure of the brake B2 is calculated, so as to make the rotation speed of the housing of the clutch C2 follow the target value therefor. Further, also based upon the difference between the calculated target rotation speed Nc0t and the actual rotation speed NC0 detected by the C0 rotation speed sensor 206, an amount of modification $\Delta PB0$ to be effected with respect to the oil pressure of the brake B0 is calculated, so as to make the rotation speed of the housing of the clutch C0 follow the target value therefor.

In step 170, the new due value PB2n of the oil pressure of the brake B2 is calculated so as to modify the value thereof PB2n-1 obtained in the scanning control cycle preceding one cycle the present scanning control cycle by a half of the calculated due amount for the modification. Further, also with respect to the brake B0, a new due value PB0n of the oil pressure in the brake B0 is calculated so as to modify the value thereof PB0n-1 obtained in the just preceding scanning cycle by a half of the calculated due amount for the modification. By so doing, a filtering effect is obtained which removes a noise in the input data (such as a fluctuation in the rotation of the clutch housing), so that the performance of the feedback control carried out by the steps 140–180 is not affected by such a noise.

In step 180, the oil pressure of the brake B2 is controlled to coincide with the new due value PB2n, and the oil pressure of the brake B0 is also controlled to coincide with the new due value PB0n.

The changes of the rotation speeds NC2 and NC0 of the housings of the clutches C2 and C0, the oil pressures PB2 and PB0 of the brakes B2 and B0, and the torque of the output shaft of the transmission during the 2nd to 3rd upshifting controlled according to the routine shown in FIG. 3, are diagrammatically illustrated in FIG. 4, for a 2–3 upshifting according to an increase of vehicle speed relative to throttle opening.

As is reflected in FIG. 4, when the 2nd to 3rd upshifting starts at time point to, according to the judgment in step 20, due to the gradual supply of oil to the brake B2 started in step 30, the oil pressure PB2 of the brake B2, after a delay of time to cancel a clearance in the corresponding servo system, starts to increase substantially at a time point t1, at at a time point t2, the rotation speed NC2 of the housing of the clutch C2 starts to decrease gradually. On the other hand, substantially at the same time, in step 40, the oil pressure of the brake B0 is immediately lowered to the stand-by pressure PB01. However, no slipping of the brake B0 yet occurs.

When Nc2 has decreased as much as "a" relative to Ns/r1, at a time point t3, the oil pressure of the brake B0 is further lowered from the stand-by pressure PB01 to a pressure PB02 across the above-mentioned threshold pressure, so that the brake B0 immediately starts to slide. Thereafter, the oil pressure PB0 of the brake B0 is gradually lowered repetitively by a decrement which is increased to be ΔP1, ΔP2, ΔP3 and so on along with a lapse of time such as T1, T2 and so on, although no further increase of the decrement is shown in the embodiment.

When the rotation speed NC0 of the housing of the clutch C0 has increased up to the predetermined value "b", at time point t4, in the shown embodiment, a coordinated feedback control of the oil pressure PB2 of the brake B2 and the oil pressure PB0 of the brake B0 according to the steps 140–180 is started, so as to watch the rotation speed NC2 of the housing of the clutch C2 and to make it follow a calculated performance curve, while on the other hand, to watch the rotation speed NC0 of the housing of the clutch C0 and to make it follow a calculated performance curve. This coordinated feedback control of the brake B0 and the brake B2 is carried out until Nc2 decreases down to "c" at a time point t5. Thereafter, at a time point t6, the housing of the clutch C2 stops.

Thus, according to the present invention, when the transmission includes a plurality of gear units connected in a tandem arrangement and highly sensitive to the timing coordination of the controls of the respective gear units, the shift control is carried out to optimize the most delicate coordination timing in the starting phase of exchange of the two gear units, whereby the rotation of the housing of the clutch C0 is started with high gradualness at high accuracy in a short predetermined period range, so as thereby to flatten the output torque performance in this region. According to such a coordination control for the engagement of the brake B2 and the disengagement of the brake B0 on a real time basis, the oil pressures PB2 and PB0 and the rotation speeds NC2 and NC0 change as shown in FIG. 4, and in accordance therewith the torque of the output shaft of the transmission changes as shown in FIG. 4, wherein a particular improvement of the torque performance available by the present invention is seen around the time point t4, where the torque would otherwise fluctuate more unstably.

In FIG. 4, the solid lines show an example of the 2nd to 3rd speed stage shifting which occurs due to an increase of the vehicle speed relative to the throttle opening. As is well known in the art, a similar 2nd to 3rd speed stage shifting occurs due to a decrease of the throttle opening relative to the vehicle speed. In such a 2nd to 3rd speed stage shifting due to a decrease of the throttle opening relative to the vehicle speed, since the engine output may quickly decrease, it is generally desirable that the disengagement of the brake B0 which has an effect of increasing the engine rotation speed is relatively expedited. Therefore, the magnitude of the decrements such as ΔP1, ΔP2, . . . in the 2nd to 3rd upshifting due to a decrease of the throttle opening relative to the vehicle speed is somewhat increased as compared with that of the corresponding decrements in the 2nd to 3rd upshifting due to an increase of the vehicle speed relative to the throttle opening, so that the curve of PB0 lowers more quickly from the time point t3, as illustrated in FIG. 4 by a phantom line.

Although the invention has been described in detail with respect to a preferred embodiment thereof, it will be apparent to those skilled in the art that various modifications are possible without departing from the scope of the present invention.

We claim:

1. A method of speed stage shifting of an automatic transmission of a vehicle driven by an engine, said transmission comprising a speed change gear mechanism including rotary members such as gears and gear carriers and hydraulically operated friction engaging means and adapted to provide various speed stages according to selective engagement and disengagement of said friction engaging means, including a certain speed stage shifting during which a first one of said friction engaging means is disengaged, while a second one of said friction engaging means changes a transition state thereof, comprising the steps of:

detecting a rotation speed of a first one of said rotary members which changes rotation speed thereof according to a state of disengagement of said first friction engaging means during said certain speed stage shifting:

detecting a rotation speed of a second one of said rotary members which changes rotation speed thereof according to a state of change of transition state of said second friction engaging means during said certain speed stage shifting;

changing hydraulic pressure of said second friction engaging means at a gradual rate;

provisionally lowering hydraulic pressure of said first friction engaging means to a predetermined stand-by pressure with a start of said change of hydraulic pressure of said second friction engaging means, said stand-by pressure being such a pressure level marginally higher than a threshold pressure across which said first friction engaging means is changed from a nonsliding state to a sliding state;

further lowering the hydraulic pressure of said first friction engaging means from said stand-by pressure across said threshold pressure when it is detected that the rotation speed of said second rotary member has changed across a first predetermined threshold value therefor, with further subsequent periodical lowering of the hydraulic pressure of said first engaging friction means until it is detected that the rotation speed of said first rotary member has changed across a second predetermined threshold value therefor; and further lowering the hydraulic pressure of said first friction engaging means in coordination with said change of hydraulic pressure of said second friction engaging means toward a completion of the speed stage shifting.

2. A method according to claim 1, wherein the magnitude of lowering hydraulic pressure of said first friction means is increased based upon a predetermined lapse of time from the start of said periodical lowering of the hydraulic pressure of said first friction engaging means.

3. A method according to claim 1, wherein because the disengagement of said first friction engaging means has an effect of increasing the rotation speed of the engine, the magnitude of the periodical lowering of the hydraulic pressure of said first friction means is made relatively greater when the speed stage shifting is an upshifting due to a decrease of throttle opening relative to vehicle speed than when the speed stage shifting is an upshifting due to an increase of vehicle speed relative to throttle opening.

* * * * *